UNITED STATES PATENT OFFICE.

EDWARD E. REIGLE, OF BALTIMORE, MARYLAND, ASSIGNOR OF ONE-THIRD TO JOHN ZAJIC, OF BALTIMORE, MARYLAND.

METHOD OF WELDING COPPER.

1,098,404.      Specification of Letters Patent.     Patented June 2, 1914.

No Drawing.     Application filed March 10, 1914. Serial No. 823,713.

*To all whom it may concern:*

Be it known that I, EDWARD E. REIGLE, a citizen of the United States of America, residing at Baltimore, State of Maryland, have invented certain new and useful Improvements in Methods of Welding Copper, of which the following is a specification.

This invention relates to a method of welding metals.

The object of the invention is more particularly to provide a method of welding copper.

An efficient method of welding copper has long been sought but so far as I am aware, no practicable method is now known for accomplishing this object.

In carrying out the invention I take the metal to be welded and boil it in a strong solution of chlorate of potash for about two hours. As before stated, I then find that the copper may be cold welded without any trouble and the resultant union of the metal will be complete.

While I have found that boiling the metal in chlorate of potash, for the time stated, efficiently accomplishes the desired object, it is possible that subjecting the metal to the action of chlorate of potash in the presence of heat would secure the desired result, and I wish it to be understood that the present invention contemplates such procedure and that it is not limited to the precise method outlined.

Having described my invention, what I claim is:

1. The herein described method, which consists of boiling the copper to be welded in a solution of chlorate of potash and then welding the same.

2. The herein described method which consists of boiling the copper to be welded for two hours in a solution of chlorate of potash and then welding the same.

In testimony whereof I affix my signature in presence of two witnesses.

EDWARD E. REIGLE.

Witnesses:
R. E. MARSHALL,
W. I. HOPKINS.

Copies of this patent may be obtained for five cents each, by addressing the "Commissioner of Patents, Washington, D. C."